C. J. PITTMAN.
DIFFERENTIAL GEAR FOR MOTOR VEHICLES.
APPLICATION FILED MAY 11, 1908.

901,826.

Patented Oct. 20, 1908.

Witnesses

Inventor
Charles J. Pittman
per
James L. Norris
Attorney

UNITED STATES PATENT OFFICE.

CHARLES JOSEPH PITTMAN, OF REDFERN, NEAR SYDNEY, NEW SOUTH WALES, AUSTRALIA, ASSIGNOR OF ONE-HALF TO FRANK IRELAND, OF SYDNEY, NEW SOUTH WALES, AUSTRALIA.

DIFFERENTIAL GEAR FOR MOTOR-VEHICLES.

No. 901,826.   Specification of Letters Patent.   Patented Oct. 20, 1908.

Application filed May 11, 1908. Serial No. 432,186.

*To all whom it may concern:*

Be it known that I, CHARLES JOSEPH PITTMAN, a subject of the King of Great Britain, residing at Young and Phillip streets, Redfern, near Sydney, in the State of New South Wales, Commonwealth of Australia, have invented certain new and useful Improvements in Differential Gears for Motor-Vehicles, of which the following is a specification.

This invention relates to improved gear for motor or self propelled vehicles for the purpose of automatically varying the relation of the driving wheels to each other when describing a curve.

The object is to provide simple mechanism which will be much less expensive and more reliable than gears hitherto employed for the purpose mentioned.

My invention has special reference to motor vehicles of the side chain transmission type in which power is conveyed to a transverse shaft, from sprocket wheels on which it is transmitted by chains to sprockets on the driving wheels.

It consists in the means described whereby in negotiating a curve the tendency of the outside driving wheel to revolve more rapidly than the inside driving wheel causes the outside sprocket on the transverse shaft to rotate freely forwardly (or rearwardly on reversing the motor) and thereby permits the outside driving wheel to revolve freely.

According to my invention in its preferred form the transverse or driving shaft has loose thereon suitably notched or toothed wheels each integral with the sprocket wheel on the same side of said shaft. A double acting pawl is pivoted near to each of said notched wheels so that one of its arms or detents may take into one of the notches therein on the forward and the other on the backward drive thereby coupling the said wheels to the shaft the transmission of power being through one or other of the arms of said pawl. I may employ a two armed and a one armed pawl on opposite sides of the same driving shaft but where the vehicle is of the non-reversing type the pawls have each one arm or detent through which the power is transmitted on the forward drive.

Figure 1:
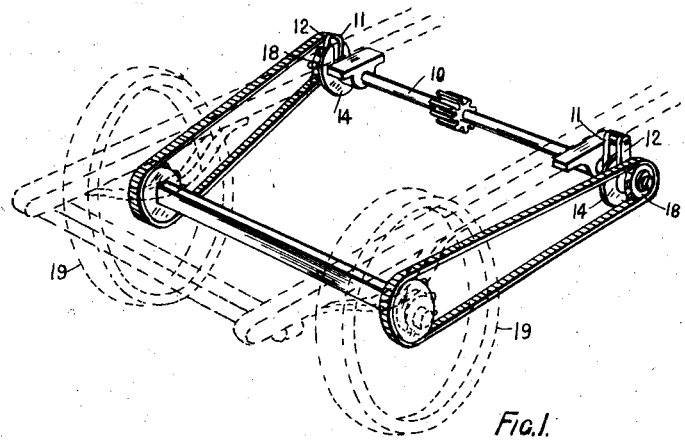
Figure 2:
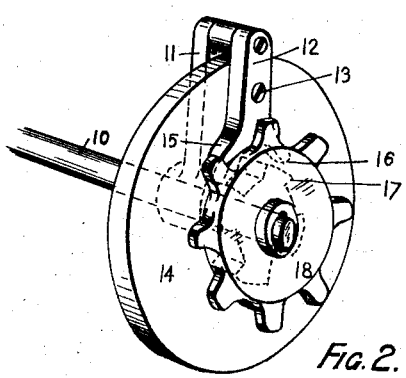
Figure 5:
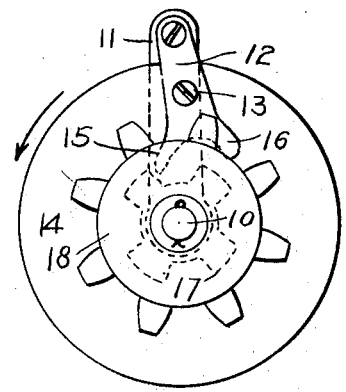
Figure 3:
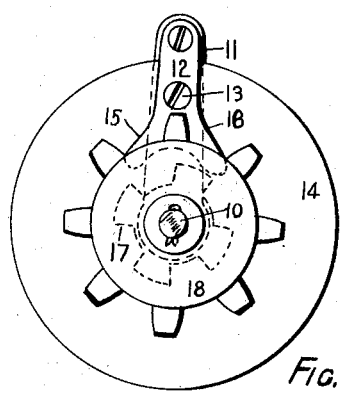
Figure 4:
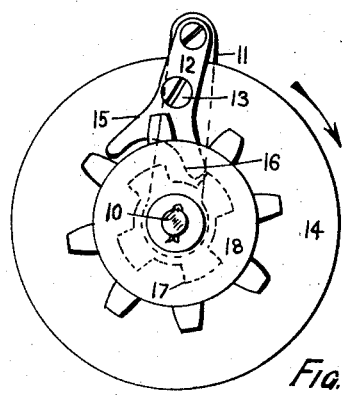

Referring to the drawings herewith:—
Figure 1 is a perspective view of the invention applied to the driving wheels of a motor car. Fig. 2 is an enlarged perspective view illustrative of the essential parts of my invention. Figs. 3, 4, and 5 are diagrammatic views showing the pawls in different positions.

The same reference numerals indicate the same or like parts.

To the transverse driving shaft 10 are keyed two crank arms 11 to each of which is pivoted the double pawl 12. Each pawl is again fulcrumed on a pin 13 which is screwed or otherwise secured into a disk 14 loose upon the shaft 10. The connection between the pawl 12 and the disk 14 is sufficiently loose to permit these parts to operate about their respective axes. The pawl has two arms or detents 15 and 16 either of which is capable of engaging with the toothed wheel or circular rack 17 integral with the sprocket wheel 18. 19 represents the driving wheels.

When a vehicle provided with my invention is running ahead the shaft 10 through the cranks 11 operates the pawls 12 so that the detent 16 on each side of the vehicle is in engagement with its toothed wheel 17 as shown in Fig. 4 the power from the driving shaft being transmitted therethrough. On the direction of the vehicle being reversed the detents 15 engage the said toothed wheels as shown in Fig. 5. When however the vehicle is describing a curve the outside driving wheel tends to revolve more rapidly than the inside driving wheel causing the outside toothed wheel 17 on the shaft 10 to slip past its pawl allowing the sprocket wheel 18 and therefore the outside driving wheel to at once run freely, the power being transmitted through the inside pawl and its toothed wheel. When an opposite curve is being negotiated the opposite sprocket and driving wheel operate in the same manner. Immediately a straight course is taken the detent 16 engages with the teeth on the wheel 17 when both sprockets on the driving shaft are coupled thereto and rotate at a uniform rate. Both arms of each pawl may be raised clear of their respective toothed wheels, such as in descending a hill, thereby allowing both driving wheels to run freely.

Should it be necessary I may provide suitable springs to engage with the pawls in order to facilitate their action.

In applying my invention to motor vehicles driven by a central chain transmission or shafting and toothed gearing on a divided axle, notched or toothed wheels such as 17 are placed on each side of the main sprocket or bevel gear wheel, that is one on each half of the shaft so that double pawls such as 12 will operate to release the outside driving wheel on taking a curve and thereby permit it to run freely.

I claim as my invention:

1. A differential gear for vehicles comprising a driving shaft, an arm fixed to turn therewith, a part loosely balanced on said shaft, a notched wheel also loosely mounted on said shaft, and a pawl pivotally mounted on said arm and fulcrumed on said part, said pawl having an arm adapted to be engaged and disengaged relatively to the notched wheel by a relative rotation of said arm and part.

2. A differential gear for motor vehicles comprising a driving shaft, an arm fixed to turn therewith, a disk loosely balanced on said shaft, a notched wheel also loosely mounted on the driving shaft, and a pawl pivotally connected to said arm and fulcrumed on said disk, the pawl having a pair of reversely arranged arms either of which is adapted to be engaged and disengaged relatively to the notched wheel by a relative rotation of said arm and disk.

3. A differential gear for motor vehicles comprising a driving shaft, an arm fixed to rotate therewith, a notched wheel loosely mounted on the driving shaft, a disk also loosely mounted on the driving shaft at one side of said arm, and a pawl pivotally connected to the free end of said arm and fulcrumed on said disk, said pawl being arranged at that side of the disk opposite to said arm and having a portion adapted to be engaged and disengaged relatively to said notched wheel by a relative rotation between said arm and disk.

In testimony whereof I have hereunto set my hand in presence of two subscribing witnesses.

CHARLES JOSEPH PITTMAN.

Witnesses:
CHARLES EDWARD GRAHAM,
HENRY WATCHORNE CLARKE.